United States Patent
Nagano et al.

(10) Patent No.: US 9,972,308 B1
(45) Date of Patent: May 15, 2018

(54) SPLITTING UTTERANCES FOR QUICK RESPONSES

(71) Applicant: INTERNATIONAL BUSINESS MACHINES CORPORATION, Armonk, NY (US)

(72) Inventors: Tohru Nagano, Tokyo (JP); Ryuki Tachibana, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/346,676

(22) Filed: Nov. 8, 2016

(51) Int. Cl.
| | |
|---|---|
| *G10L 15/00* | (2013.01) |
| *G10L 15/06* | (2013.01) |
| *G10L 15/16* | (2006.01) |
| *G10L 15/02* | (2006.01) |
| *G10L 15/197* | (2013.01) |
| *G10L 15/30* | (2013.01) |
| *G06F 17/30* | (2006.01) |
| *G06N 99/00* | (2010.01) |

(52) U.S. Cl.
CPC ...... *G10L 15/063* (2013.01); *G06F 17/30675* (2013.01); *G06F 17/30705* (2013.01); *G06F 17/30864* (2013.01); *G06N 99/005* (2013.01); *G10L 15/02* (2013.01); *G10L 15/16* (2013.01); *G10L 15/197* (2013.01); *G10L 15/30* (2013.01); *G10L 2015/0631* (2013.01)

(58) Field of Classification Search
USPC ................. 704/231–257, 270–275
See application file for complete search history.

(56) References Cited

U.S. PATENT DOCUMENTS

| | | | |
|---|---|---|---|
| 6,496,799 B1 | 12/2002 | Pickering | |
| 7,873,519 B2 | 1/2011 | Bennett | |
| 8,914,288 B2 * | 12/2014 | Williams | ................ G10L 15/04 |
| | | | 704/253 |
| 9,015,048 B2 * | 4/2015 | Arizmendi | .......... G10L 15/1822 |
| | | | 704/270.1 |

(Continued)

OTHER PUBLICATIONS

Sonntag, Daniel. "Ontologies and Adaptivity in Dialogue for Question Answering". IOS Press, Jan. 2010.*

(Continued)

*Primary Examiner* — Jesse Pullias
(74) *Attorney, Agent, or Firm* — Tutunjian & Bitetto, P.C.; Vazken Alexanian

(57) ABSTRACT

Methods, a system, and a classifier are provided. A method includes preparing, by a processor, pairs for an information retrieval task. Each pair includes (i) a training-stage speech recognition result for a respective sequence of training words and (ii) an answer label corresponding to the training-stage speech recognition result. The method further includes obtaining, by the processor, a respective rank for the answer label included in each pair to obtain a set of ranks. The method also includes determining, by the processor, for each pair, an end of question part in the training-stage speech recognition result based on the set of ranks. The method additionally includes building, by the processor, the classifier such that the classifier receives a recognition-stage speech recognition result and returns a corresponding end of question part for the recognition-stage speech recognition result, based on the end of question part determined for the pairs.

17 Claims, 8 Drawing Sheets

(56) References Cited

U.S. PATENT DOCUMENTS 9,361,880 B2 * 6/2016 Pulz .................... G10L 15/005
2015/0186527 A1 7/2015 Rao et al.
2015/0378988 A1 12/2015 Chewning et al.

OTHER PUBLICATIONS

Ghigi, F. et al., "Incremental Dialog Processing in a Task-Oriented Dialog" Interspeech (Sep. 2014) pp. 308-3112.

* cited by examiner

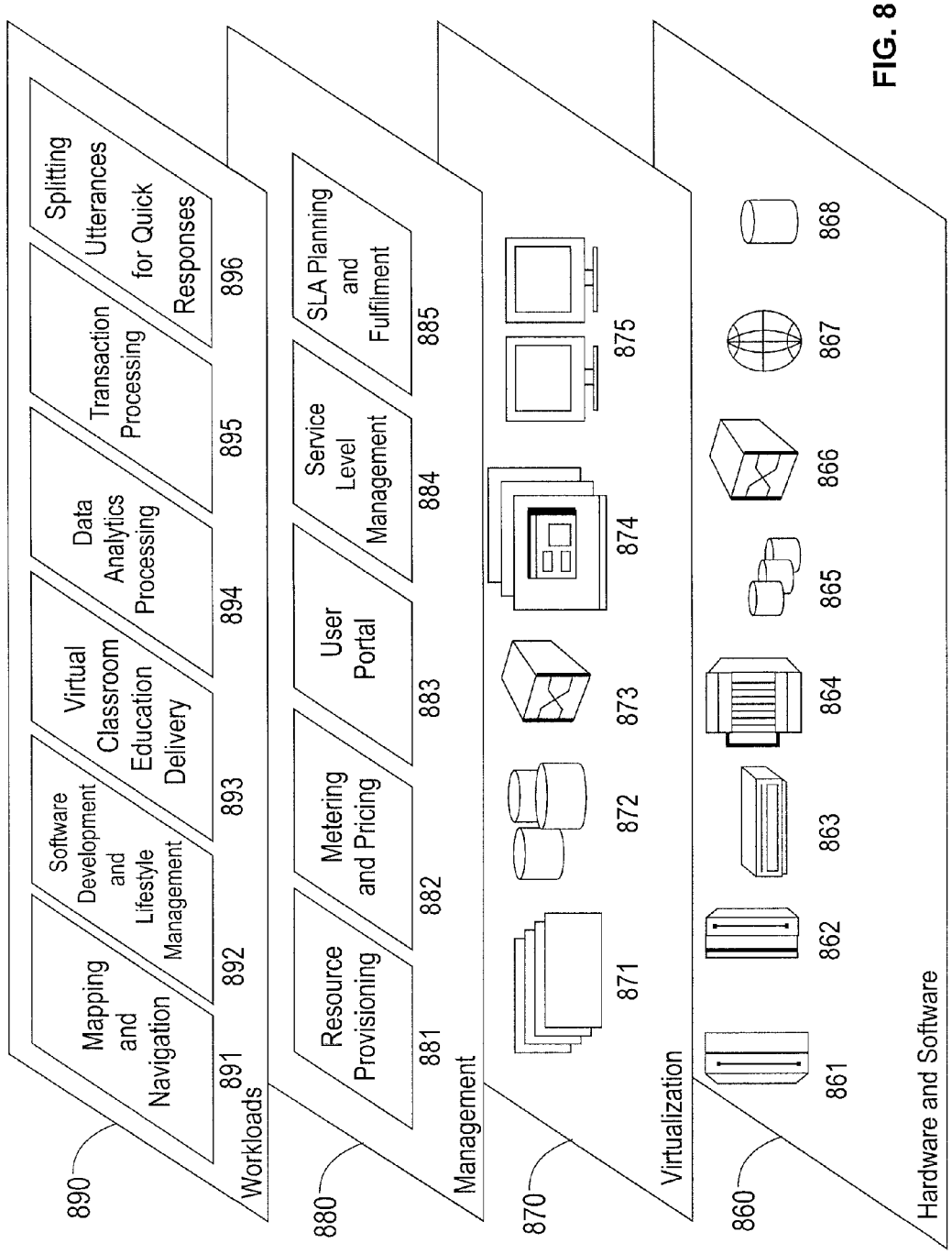

SPLITTING UTTERANCES FOR QUICK RESPONSES

BACKGROUND

Technical Field

The present invention relates generally to information processing and, in particular, to splitting utterances for quick responses.

Description of the Related Art

Current speech recognition systems can accept a voice stream and return a transcript in a timely manner with low latency. However, when a first person talks to a second person, the second person often times does not wait until the end of the first person's utterance before speaking themselves, because people often guess their response to a perceived utterance and react speculatively. Thus, using the preceding analogy, if a computer interaction system can react without waiting until the end of utterances, the system would be closer to acting like a person. Hence, there is need for a computer-based approach for providing a quick response to an utterance.

SUMMARY

According to an aspect of the present invention, a method is provided for building a classifier. The method includes preparing, by a processor, a plurality of pairs for an information retrieval task. Each of the plurality of pairs includes (i) a training-stage speech recognition result for a respective sequence of training words and (ii) an answer label corresponding to the training-stage speech recognition result. The method further includes obtaining, by the processor using a search engine, a respective rank for the answer label included in each of the plurality of pairs to obtain a set of ranks. The method also includes determining, by the processor, for each of the plurality of pairs, an end of question part in the training-stage speech recognition result based on the set of ranks. The method additionally includes building, by the processor, the classifier such that the classifier receives a recognition-stage speech recognition result and returns a corresponding end of question part for the recognition-stage speech recognition result, based on the end of question part determined for the plurality of pairs.

According to another aspect of the present invention, a computer program product is provided for building a classifier. The computer program product includes a non-transitory computer readable storage medium having program instructions embodied therewith. The program instructions are executable by a computer to cause the computer to perform a method. The method includes preparing, by a processor, a plurality of pairs for an information retrieval task. Each of the plurality of pairs includes (i) a training-stage speech recognition result for a respective sequence of training words and (ii) an answer label corresponding to the training-stage speech recognition result. The method further includes obtaining, by the processor using a search engine, a respective rank for the answer label included in each of the plurality of pairs to obtain a set of ranks. The method also includes determining, by the processor, for each of the plurality of pairs, an end of question part in the training-stage speech recognition result based on the set of ranks. The method additionally includes building, by the processor, the classifier such that the classifier receives a recognition-stage speech recognition result and returns a corresponding end of question part for the recognition-stage speech recognition result, based on the end of question part determined for the plurality of pairs.

According to yet another aspect of the present invention, a system is provided. The system includes a processor. The processor is configured to prepare a plurality of pairs for an information retrieval task. Each of the plurality of pairs includes (i) a training-stage speech recognition result for a respective sequence of training words and (ii) an answer label corresponding to the training-stage speech recognition result. The processor is further configured to obtain, using a search engine, a respective rank for the answer label included in each of the plurality of pairs to obtain a set of ranks. The processor is also configured to determine for each of the plurality of pairs, an end of question part in the training-stage speech recognition result based on the set of ranks. The processor is additionally configured to build a classifier that receives a recognition-stage speech recognition result and returns a corresponding end of question part for the recognition-stage speech recognition result, based on the end of question part determined for the plurality of pairs.

According to still another aspect of the present invention, a classifier is provided for detecting an end of question part in speech recognition results. The classifier includes a storage unit for storing a plurality of clusters. Each of the plurality of clusters includes at least one partial set of words. Each of the partial set of words is a set of words from a beginning of a training-stage speech recognition result to the end of question part of the training-stage speech recognition result. The classifier further includes a processor unit for calculating, in response to receiving a recognition-stage speech recognition result incrementally in a word by word manner as an input, a similarity between the input and the plurality of clusters. The classifier also includes an output unit for outputting the end of question part for the recognition-stage speech recognition result based on the similarity between the input and any of the plurality of clusters being less than a predetermined threshold.

According to still yet another aspect of the present invention, a method is provided for detecting an end of question part in speech recognition results. The method includes storing, in a storage unit, a plurality of clusters. Each of the plurality of clusters includes at least one partial set of words. Each of the partial set of words is a set of words from a beginning of a training-stage speech recognition result to the end of question part of the training-stage speech recognition result. The method further includes calculating, by a processor, in response to receiving a recognition-stage speech recognition result incrementally in a word by word manner as an input, a similarity between the input and the plurality of clusters. The method also includes outputting, by the processor, the end of question part for the recognition-stage speech recognition result based on the similarity between the input and any of the plurality of clusters being less than a predetermined threshold.

These and other features and advantages will become apparent from the following detailed description of illustrative embodiments thereof, which is to be read in connection with the accompanying drawings.

BRIEF DESCRIPTION OF DRAWINGS

The following description will provide details of preferred embodiments with reference to the following figures wherein:

FIG. 8 shows an exemplary set of functional abstraction layers provided by the cloud computing environment shown in FIG. 7, in accordance with an embodiment of the present invention.

DETAILED DESCRIPTION

The present invention are directed to splitting utterances for quick responses.

In an embodiment, the present invention provides an agent supporting system using a real-time speech recognition system that can show a list of appropriate answer candidates to customers' questions.

As used herein, the term "EOQ" refers to the "End Of Question" part of a speech recognition result. Also herein, the terms "speech recognition result" and "decoded utterance" are used interchangeably.

In an embodiment, the present invention detects split points of consecutive speech recognition results that are optimized for a search system.

In an embodiment, the present invention generates a classifier to detect End Of Question parts in speech recognition results using training data, detects the EOQ in an input consecutive speech recognition result, and splits the speech recognition result at the EOQ. In this way, a quick response can be provided to the input consecutive speech recognition result.

Figure 1:
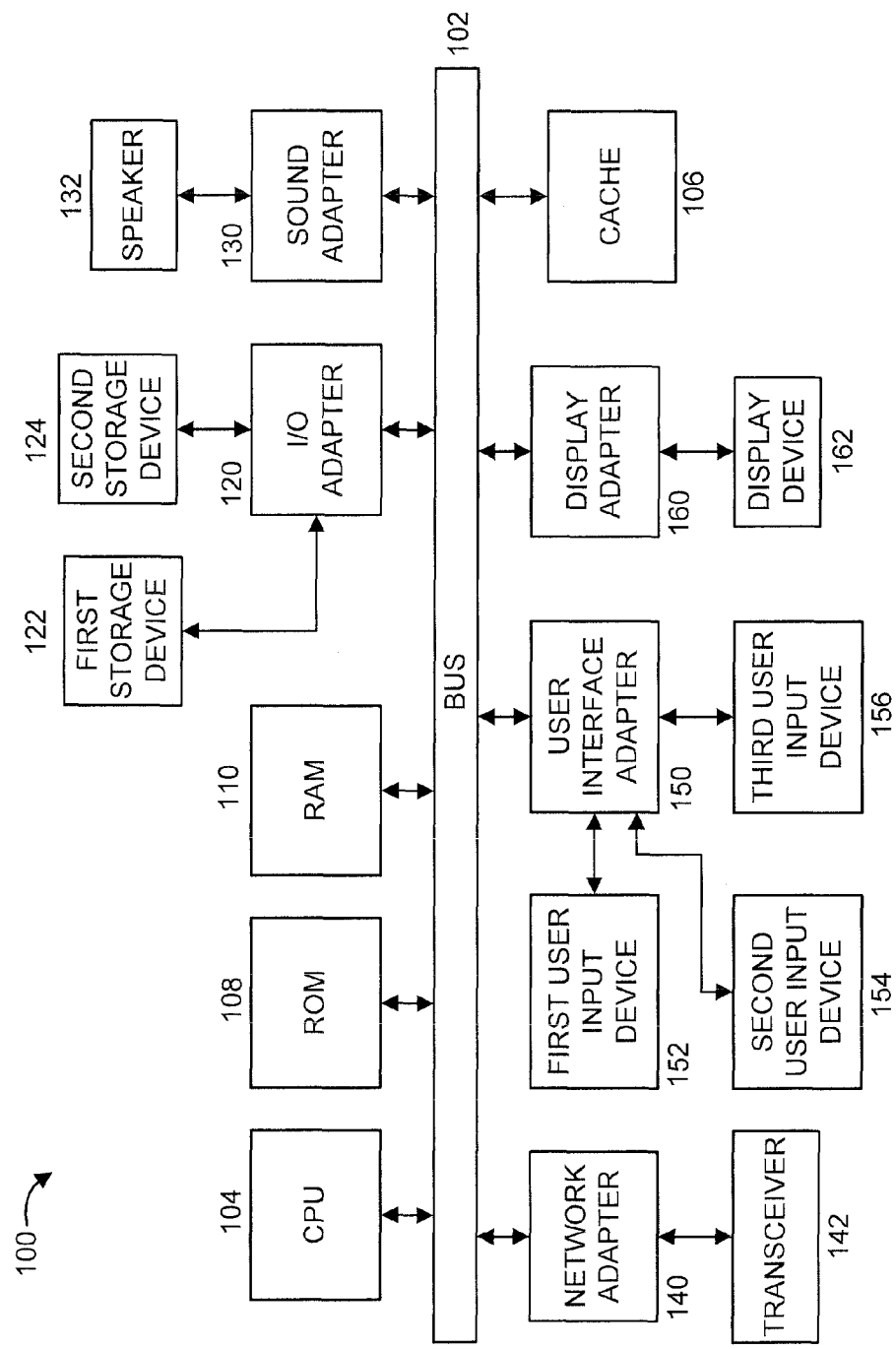
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
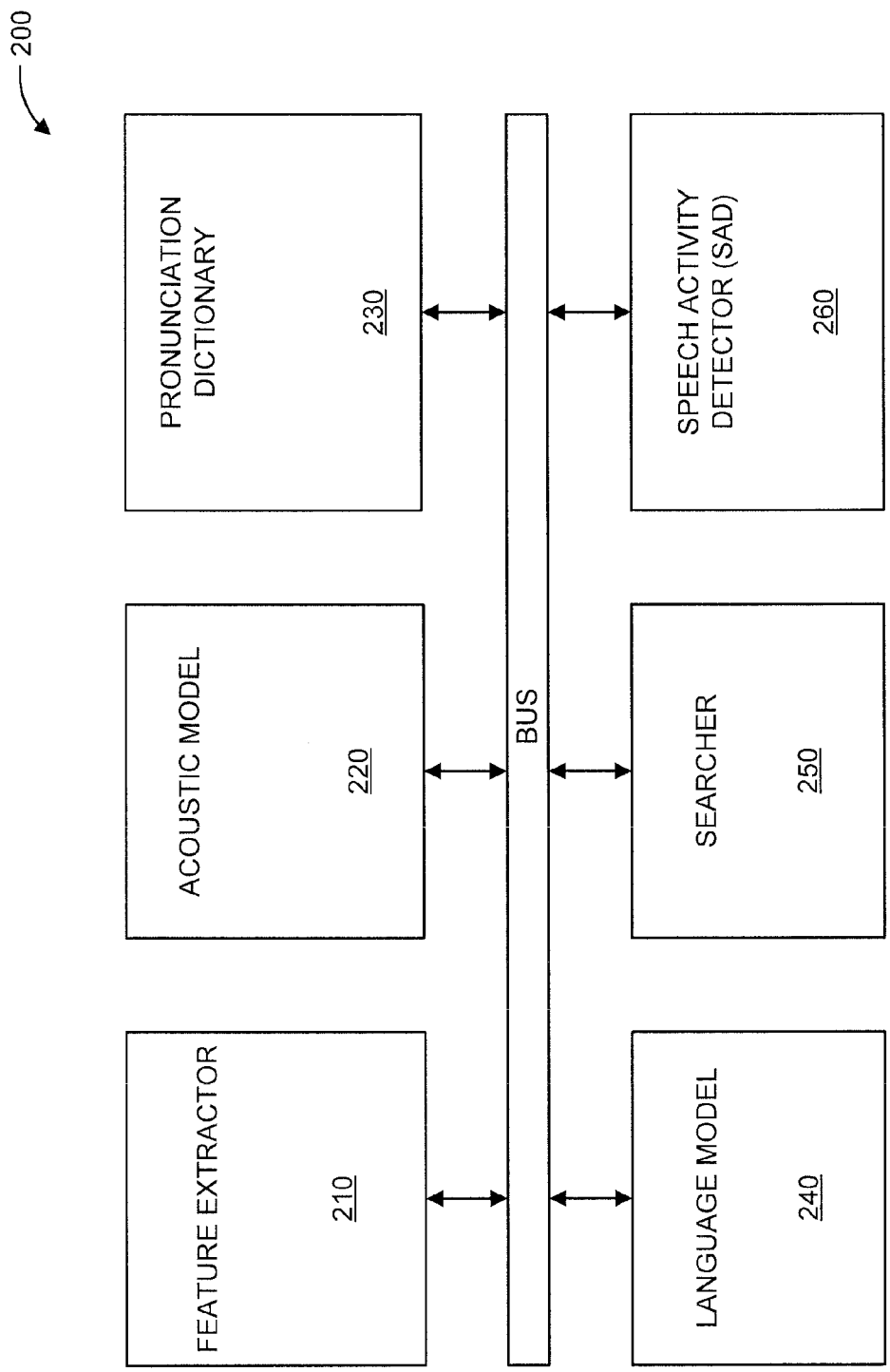
FIG. 2 shows an exemplary automatic speech recognition system (ASR), in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 4:
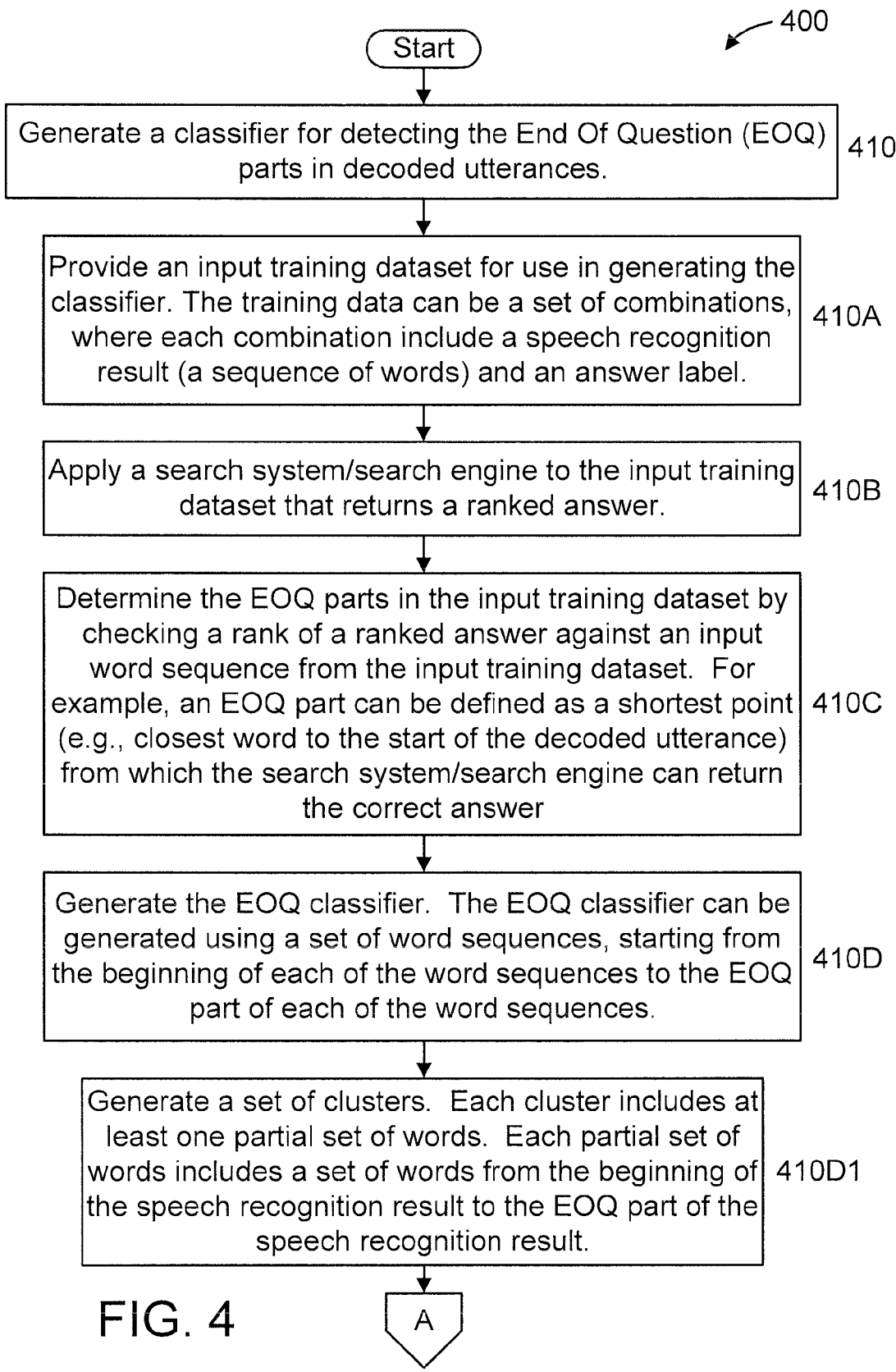
FIGS. 4-5 show an exemplary method for splitting utterances for quick responses, in accordance with an embodiment of the present invention.
Figure 5:
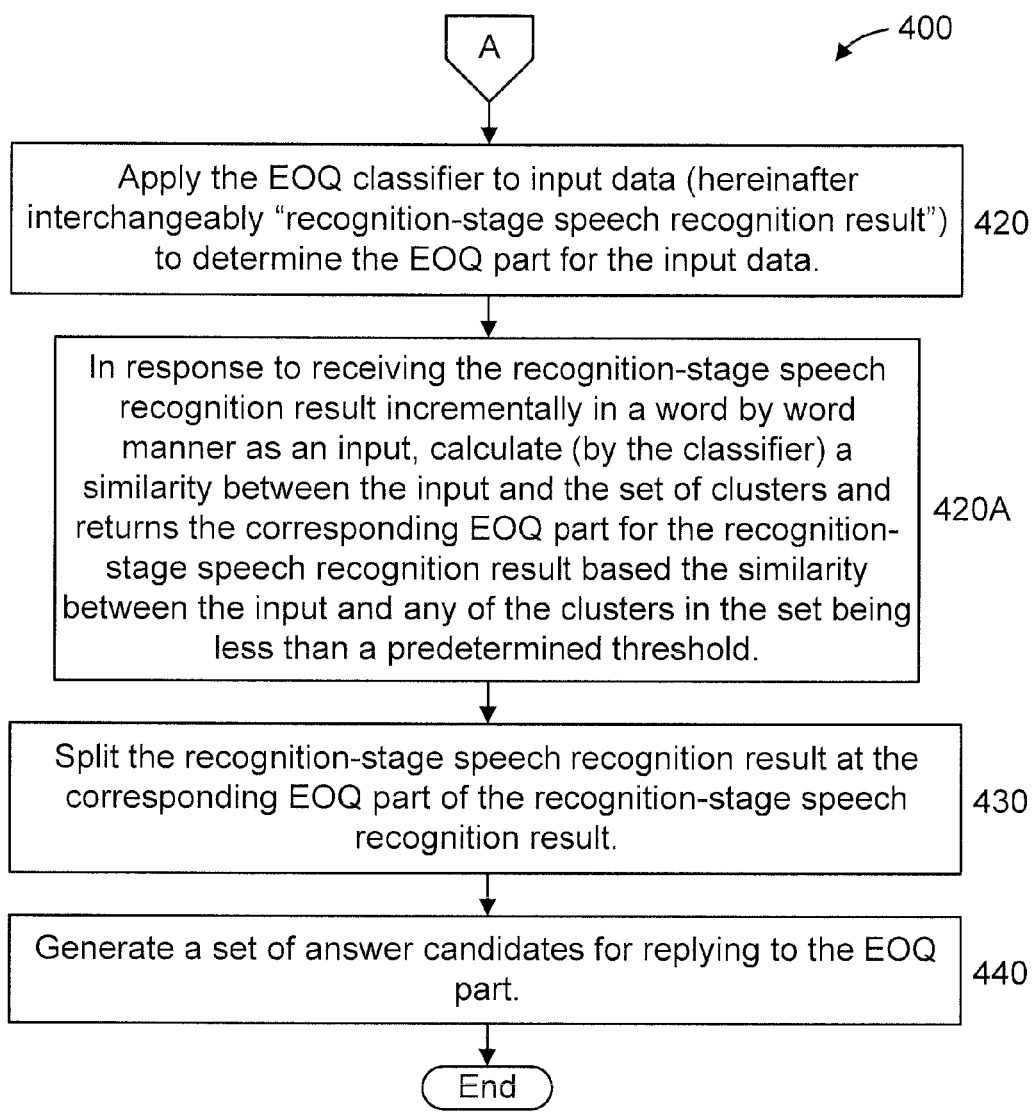

Further, it is to be appreciated that processing system 100 may perform at least part of the method described herein including, for example, at least part of method 400 of FIGS. 4-5. Similarly, part or all of system 200 may be used to perform at least part of method 400 of FIGS. 4-5.

FIG. 2 shows an exemplary automatic speech recognition system (ASR) 200, in accordance with an embodiment of the present invention.

The system 200 includes a feature extractor 210, an acoustic model 220, a pronunciation dictionary 230, a language model 240, a searcher 250, and a speech activity detector 260.

The searcher 250 performs a search using inputs provided from the feature extractor 210, the acoustic model 220, the pronunciation dictionary 230, and the language model 240 to output one or more words representative of a decoded acoustic utterance. While mentioned in singular form, the feature extractor 210, the acoustic model 220, the pronunciation dictionary 230, and the language model can each include more than one of that element. For example, the acoustic model 220 can include multiple acoustic models, at least two being of a different type.

In a word recognition task, given an acoustic signal corresponding to a sequence of words $X=x_1, x_2, \ldots, x_n$, the feature extractor 210 first generates a compact representation of the input as sequence of feature vectors $Y=y_1, y_2, \ldots, y_t$. Some exemplary features that can be extracted by the feature extractor 210 include, but are not limited to, signal energy, pitch, zero crossing rate, and so forth. It is to be appreciated that the preceding features are merely illustrative and, thus, other features can also be extracted in accordance with the teachings of the present invention, while maintaining the spirit of the present invention.

The acoustic model 220, the pronunciation dictionary 230, and the language model 240 are then used by the searcher 250 to find the most probable word sequence X given these feature vectors. This is done by expressing the desired probability p(X|Y) using Bayes theorem as follows:

$$\hat{X} = \underset{X}{\operatorname{argmax}}\, p^{(X|Y)} = \underset{X}{\operatorname{argmax}}\, \frac{p(Y|X)p(X)}{p(Y)}$$

where p(X) is the a priori probability of observing a sequence of words in the language, independent of any acoustic evidence and is modeled using the language model component. p(X) corresponds to the likelihood of the acoustic features Y being generated given the word sequence X.

The language model 240 and the acoustic model 220 can be stochastic models trained using large amounts training data. Hidden Markov Models (HMMs) or a hybrid combination of neural networks and HMMs can be used to implement acoustic model 220.

For large vocabulary speech recognition, not all words have an adequate number of acoustic examples in the training data. The acoustic data also covers only a limited vocabulary of words. Instead of modeling incorrect probability distributions of entire words or utterances using limited examples, the acoustic model 220 is built for basic speech sounds. By using these basic units, the system 200 can also recognize words without acoustic training examples. It is to be appreciated that the basic speech sounds can be context independent phones or context dependent phones or any other such speech sounds.

To compute the likelihood p(Y|X), each word in the hypothesized word sequence X is first broken down into its constituent phones using the pronunciation dictionary 230. A single composite acoustic model for the hypothesis is constructed by combining individual phone HMMs. In practice, to account for the large variability of basic speech sounds, HMMs of context dependent speech units with continuous density output distributions can be used. There exist efficient algorithms like the Baum-Welch algorithm to learn the parameters of the acoustic model from training data. Neural network based acoustic models can be used instead of, or in addition to, HMM-GMM based models.

The language model 240 generates the a priori probability p(x). The language model 240 can be an N-gram based language model(s), where typically bi-grams or tri-grams are used. Although p(x) is the probability of a sequence of words, N-grams model this probability assuming the probability of any word xi depends on only N−1 preceding words. These probability distributions are estimated from simple frequency counts that can be directly obtained from large amounts of text. To account for the inability to estimate counts for all possible N-gram sequences, techniques like discounting and back-off are used. The language model 240 can be, but is not limited to, a Neural Network based language model and/or a class based language model.

The speech activity detector 260 detects speech in an input signal that includes one or more acoustic utterances uttered by a speaker, so that the subsequent steps of speech recognition can focus on the speech portions of the input signal.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention. Moreover, it is to be appreciated that other types and configurations of a speech recognition system can also be used in accordance with the teachings of the present invention, while maintaining the spirit of the present invention. For example, template matching based systems using forms of dynamic time warping can be used, a probabilistic language model could be replaced by a rule based grammar model, and so forth. The ASR system can also be simple recognizer just recognizing phonemes, it could be a simple isolated word recognizer, a digit recognizer based on rules or a large vocabulary continuous speech recognizer, the components of which we have described. These and other types of speech recognition systems and constituent elements are readily determined by one of ordinary skill in the art, given the teachings of the present invention provided herein, while maintaining the spirit of the present invention.

Figure 3:
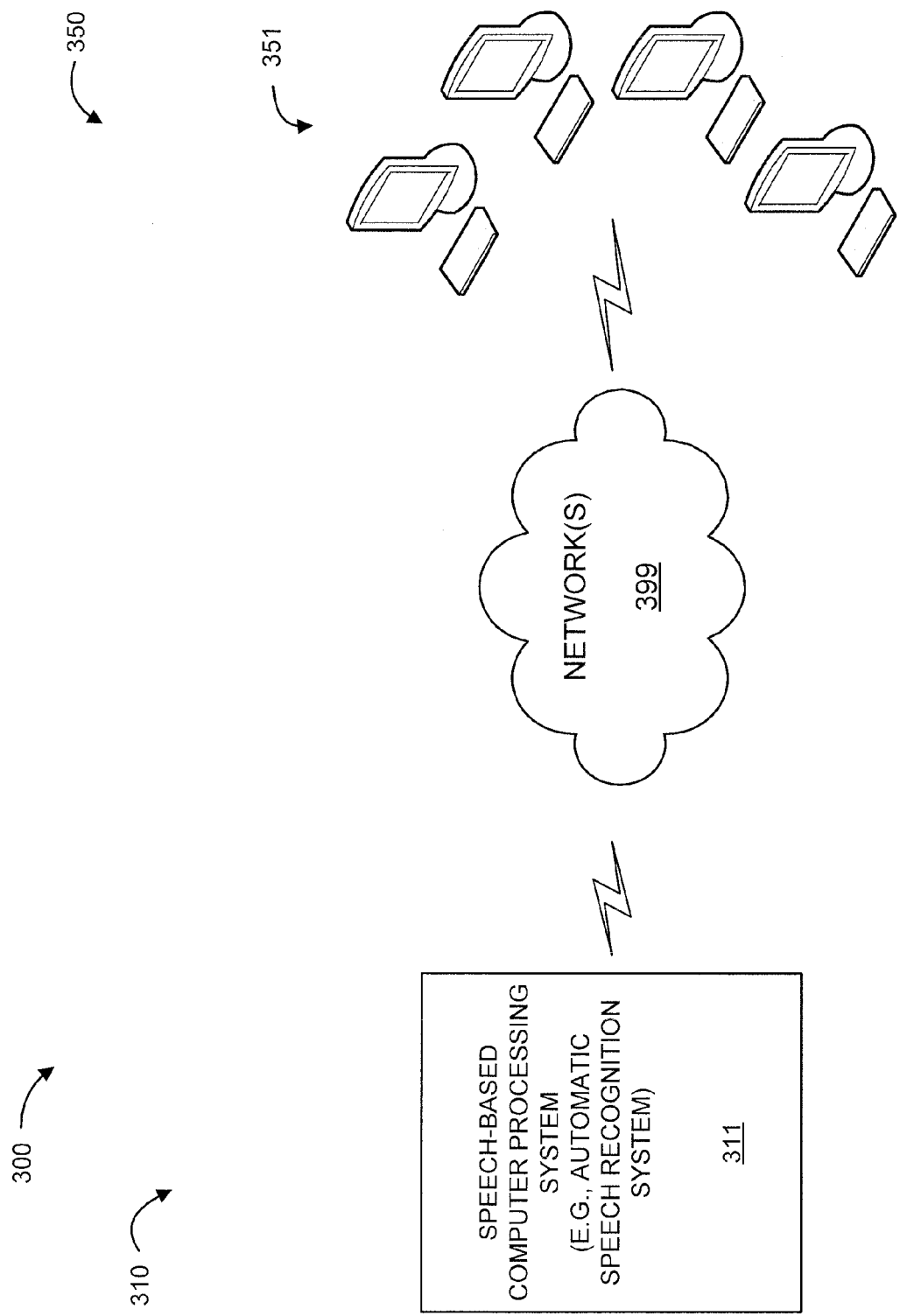
FIG. 3 shows an exemplary operating environment to which the present invention can be applied, in accordance with an embodiment of the present invention.

FIG. 3 shows an exemplary operating environment 300 to which the present invention can be applied, in accordance with an embodiment of the present invention.

The environment 300 involves a server side 310 and a client side 350.

The server side 310 includes a speech-based computer processing system. For illustrative purposes, the speech-based computer processing system is an automatic speech recognition system (ASR) 311. In an embodiment, ASR 311 can be implemented as ASR 200 from FIG. 2. However, it is to be appreciated that block 311 can represent any speech-based computer processing system that involves one or more of the following: speech recognition; speaker identification; speaker verification; speaker diarisation; language identification; keyword spotting; emotion detection; automatic translation; court reporting; hands-free computing; home automation; mobile telephony; and so forth.

The client side 350 includes a set of workstations 351.

Users at the workstations 351 can engage in and/or otherwise use speech recognition sessions. The speech recognition sessions can relate, but are not limited to, customer service, voice dialing, machine control, data searching, data entry, system/facility/entity access, and so forth.

Communications between the server side 310 and the client side 350 are made through one or more networks 399.

FIGS. 4-5 show an exemplary method 400 for splitting utterances for quick responses, in accordance with an embodiment of the present invention.

At step 410, generate a classifier for detecting the End Of Question (EOQ) parts in decoded utterances.

In an embodiment, step 410 includes steps 410A-410D.

At step 410A, provide an input training dataset for use in generating the classifier. In an embodiment, the training data is a set of combinations, where each combination include a speech recognition result (a sequence of words) and an answer label.

At step 410B, apply a search system/search engine to the input training dataset that returns a ranked answer.

Figure 6:
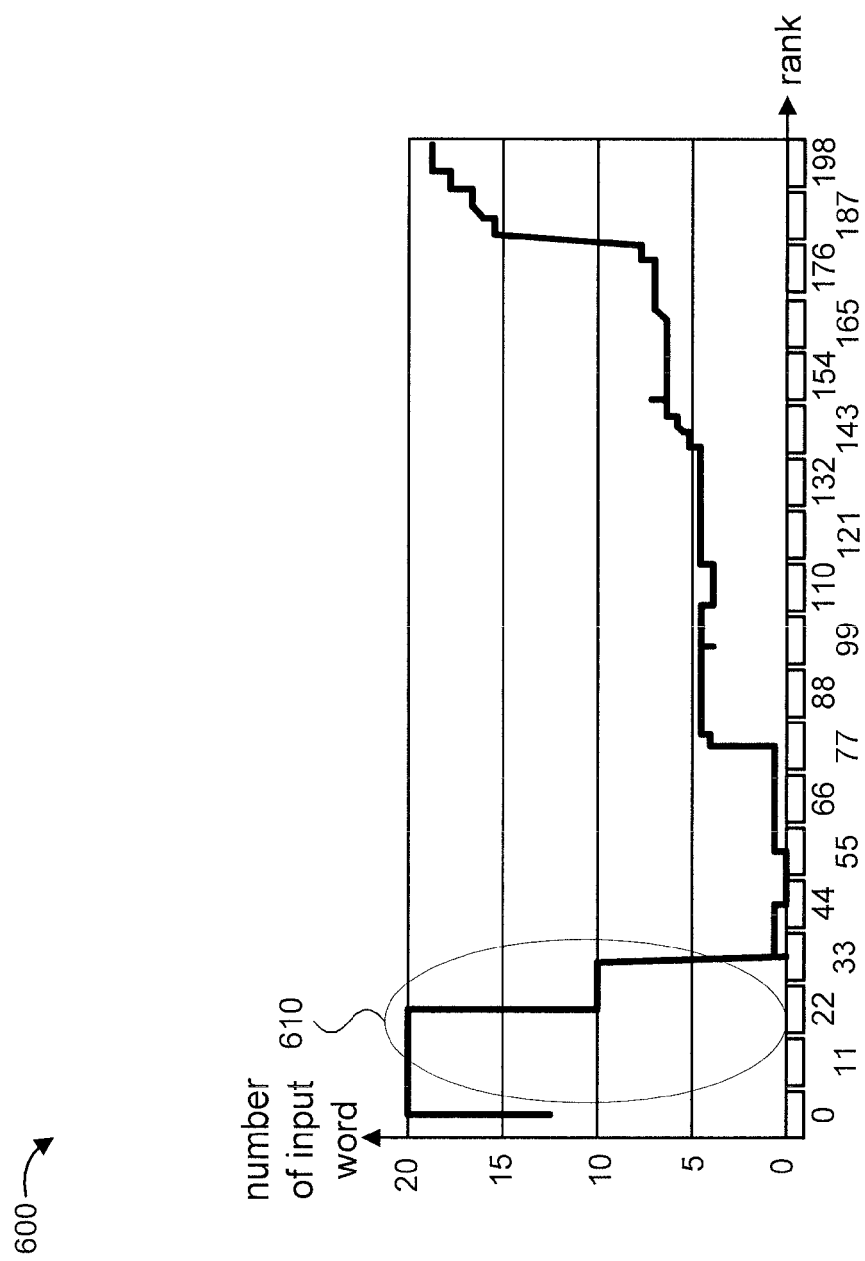
FIG. 6 shows an exemplary graph for determining End Of Question (EOQ) parts, in accordance with an embodiment of the present invention.

At step 410C, determine the EOQ parts in the input training dataset by checking a rank of a ranked answer against an input word sequence from the input training dataset. In an embodiment, an EOQ part is defined as a shortest point (e.g., closest word to the start of the decoded utterance) from which the search system/search engine can return the correct answer. FIG. 6 shows an exemplary graph 600 for determining End Of Question (EOQ) parts, in accordance with an embodiment of the present invention. In the graph, the x-axis denotes the number of the input word, and the y-axis denotes the rank of the answer for the input word. An EOQ part is denoted by the reference numeral 610.

At step 410D, generate the EOQ classifier. In an embodiment, the EOQ classifier is generated using a set of word sequences, starting from the beginning of each of the word sequences to the EOQ part of each of the word sequences.

In an embodiment, step 410D includes step 410D1.

At step 410D1, generate a set of clusters. Each of the clusters includes at least one partial set of words. Each of the partial set of words includes a set of words from the beginning of the speech recognition result to the EOQ part of the speech recognition result. In an embodiment, the clusters include a Bag-Of-Words (BOW). In an embodiment, K-means clustering is used. However, it is to be appreciated that the present principles are not limited to any specific clustering technique and, thus, any clustering technique can be used, while maintaining the spirit of the present principles.

At step 420, apply the EOQ classifier to input data (hereinafter interchangeably referred to as "recognition-stage speech recognition result") to determine the EOQ part for the input data.

In an embodiment, step 420 includes step 420A.

At step 420A, in response to receiving the recognition-stage speech recognition result incrementally in a word by word manner as an input, calculate (by the classifier) a similarity between the input and the set of clusters and returns the corresponding EOQ part for the recognition-stage speech recognition result based the similarity between the input and any of the clusters in the set being less than a predetermined threshold.

At step 430, split the recognition-stage speech recognition result at the corresponding EOQ part of the recognition-stage speech recognition result.

At step 440, generate a set of answer candidates for replying to the EOQ part. The set of answer candidates can be generated based on information retrieval techniques or natural language question answering techniques. The candidates can be given as a set of answer documents with confidence scores that correspond to a given speech recognition result of the EOQ part. The confidence value is calculated by comparing the speech recognition result and each of answer documents. For example, cosine similarity using tf-idf value of the documents or cosign similarity using dimensionality reduced documents are used. It is to be appreciated that the set of answer candidates can be provided immediately upon the detection of the EOQ part.

The following are sample utterances annotated to include "<EOQ>", where "<EOQ>" denotes the End of Question part of an utterance.

For example, it would be useful if the system return answers at the End Of Question part (<EOQ>).

Example 1

I want to change the password <EOQ>, and what I should to change it?

Example 2

Would you re-issue my cash card? Can you accept by this phone call <EOQ> or I have to go to the branch?

Example 3

I use internet banking. Tell me upper limit <EOQ> of the amount of money transfer per day.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
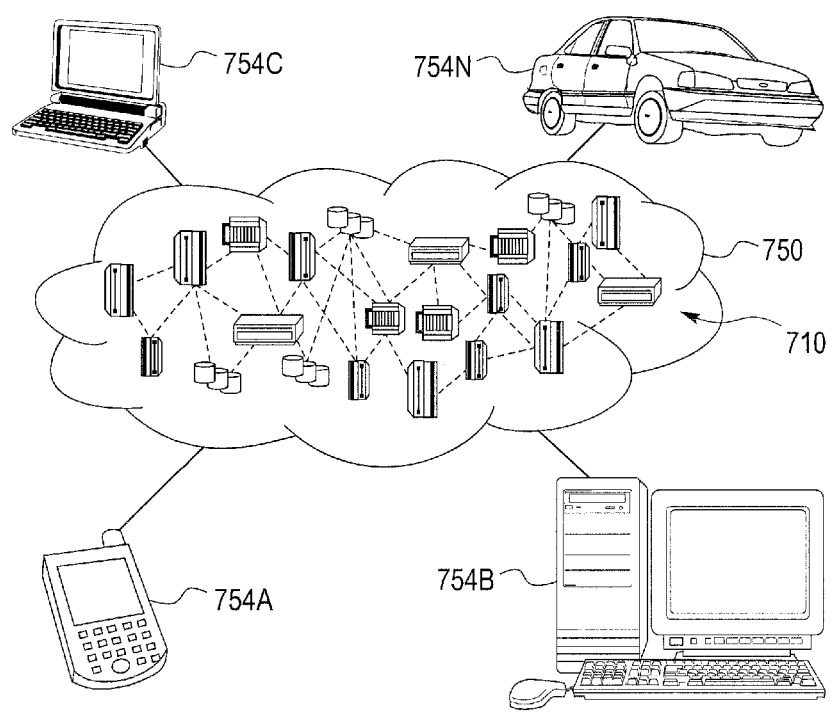
FIG. 7 shows an exemplary cloud computing environment, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and splitting utterances for quick responses 896.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for building a classifier, comprising:
   preparing, by a processor, a plurality of pairs for an information retrieval task, each of the plurality of pairs including (i) a training-stage speech recognition result for a respective sequence of training words and (ii) an answer label corresponding to the training-stage speech recognition result;
   obtaining, by the processor using a search engine, a respective rank for the answer label included in each of the plurality of pairs to obtain a set of ranks;
   determining, by the processor, for each of the plurality of pairs, an end of question part in the training-stage speech recognition result based on the set of ranks;
   building, by the processor, the classifier such that the classifier receives a recognition-stage speech recognition result and returns a corresponding end of question part for the recognition-stage speech recognition result, based on the end of question part determined for the plurality of pairs;
   splitting, by the processor, the recognition-stage speech recognition result at the corresponding end of question part for the recognition-stage speech recognition result;
   generating, by the processor, a set of answer candidates for replying to the corresponding end of question part for the recognition-stage speech recognition result; and
   providing, by a display device, the set of answer candidates to a user.

2. The method of claim 1, wherein the end of question part for a given one of the plurality of pairs is determined based on a rank change of a part of the respective sequence of training words included in the training-stage speech recognition result for the given one of the plurality of pairs.

3. The method of claim 1, wherein building the classifier comprises generating a plurality of clusters, each of the plurality of clusters comprising at least one partial set of words, each of the at least one partial set of words including a set of words from the beginning of the speech recognition result to the end of question part of the speech recognition result.

4. The method of claim 3, wherein in response to receiving the recognition-stage speech recognition result incrementally in a word by word manner as an input, the classifier calculates a similarity between the input and the plurality of clusters and returns the corresponding end of question part for the recognition-stage speech recognition result based the similarity between the input and any of the plurality of clusters being less than a predetermined threshold.

5. The method of claim 3, wherein the plurality of clusters are generated by grouping together end of question parts that include the same or similar words.

6. The method of claim 1, wherein for a given pair from among the plurality of pairs, the end of question part in the training-stage speech recognition result for the given pair is determined by checking the respective rank for the answer label included in the given pair against the respective rank for the answer label included in other ones of the plurality of pairs.

7. The method of claim 1, wherein a first encountered word in the training-stage speech recognition result that results in a correct answer label for the training stage speech recognition result is determined as the end of question part in the training-stage speech recognition result.

8. The method of claim 1, wherein said obtaining step comprises generating a data structure that correlates an occurrence number of a word in a word sequence to the rank for the word in the word sequence.

9. A computer program product for building a classifier, the computer program product comprising a non-transitory computer readable storage medium having program instructions embodied therewith, the program instructions executable by a computer to cause the computer to perform a method comprising:
   preparing, by a processor, a plurality of pairs for an information retrieval task, each of the plurality of pairs including (i) a training-stage speech recognition result for a respective sequence of training words and (ii) an answer label corresponding to the training-stage speech recognition result;
   obtaining, by the processor using a search engine, a respective rank for the answer label included in each of the plurality of pairs to obtain a set of ranks;
   determining, by the processor, for each of the plurality of pairs, an end of question part in the training-stage speech recognition result based on the set of ranks;
   building, by the processor, the classifier such that the classifier receives a recognition-stage speech recognition result and returns a corresponding end of question part for the recognition-stage speech recognition result, based on the end of question part determined for the plurality of pairs;
   splitting, by the processor, the recognition-stage speech recognition result at the corresponding end of question part of the recognition-stage speech recognition result;
   generating, by the processor, a set of answer candidates for replying to the corresponding end of question part for the recognition-stage speech recognition result; and
   providing, by a display device, the set of answer candidates to a user.

10. The computer program product of claim 9, wherein building the classifier comprises generating a plurality of clusters, each of the plurality of clusters comprising at least one partial set of words, each of the at least one partial set of words including a set of words from the beginning of the speech recognition result to the end of question part of the speech recognition result.

11. The computer program product of claim 10, wherein in response to receiving the recognition-stage speech recognition result incrementally in a word by word manner as an input, the classifier calculates a similarity between the input and the plurality of clusters and returns the corresponding end of question part for the recognition-stage speech recognition result based the similarity between the input and any of the plurality of clusters being less than a predetermined threshold.

12. The computer program product of claim 9, wherein for a given pair from among the plurality of pairs, the end of question part in the training-stage speech recognition result for the given pair is determined by checking the respective rank for the answer label included in the given pair against the respective rank for the answer label included in other ones of the plurality of pairs.

13. The computer program product of claim 9, wherein a first encountered word in the training-stage speech recognition result that results in a correct answer label for the training stage speech recognition result is determined as the end of question part in the training-stage speech recognition result.

14. The computer program product of claim 9, wherein said obtaining step comprises generating a data structure that correlates an occurrence number of a word in a word sequence to the rank for the word in the word sequence.

15. A system, comprising:
a processor, configured to:
prepare a plurality of pairs for an information retrieval task, each of the plurality of pairs including (i) a training-stage speech recognition result for a respective sequence of training words and (ii) an answer label corresponding to the training-stage speech recognition result;
obtain, using a search engine, a respective rank for the answer label included in each of the plurality of pairs to obtain a set of ranks;
determine for each of the plurality of pairs, an end of question part in the training-stage speech recognition result based on the set of ranks;
build a classifier that receives a recognition-stage speech recognition result and returns a corresponding end of question part for the recognition-stage speech recognition result, based on the end of question part determined for the plurality of pairs;
split the recognition-stage speech recognition result at the corresponding end of question part of the recognition-stage speech recognition result; and
generate a set of answer candidates for replying to the corresponding end of question part for the recognition-stage speech recognition result; and
a display device for providing the set of answer candidates to a user.

16. A classifier for detecting an end of question part in speech recognition results, the classifier comprising;
a storage unit for storing a plurality of clusters, each of the plurality of clusters comprising at least one partial set of words, each of the partial set of words being a set of words from a beginning of a training-stage speech recognition result to the end of question part of the training-stage speech recognition result;
a processor unit for
calculating, in response to receiving a recognition-stage speech recognition result incrementally in a word by word manner as an input, a similarity between the input and the plurality of clusters; and
outputting the end of question part for the recognition-stage speech recognition result based on the similarity between the input and any of the plurality of clusters being less than a predetermined threshold;
splitting the recognition-stage speech recognition result at the corresponding end of question part of the recognition-stage speech recognition result;
generating a set of answer candidates for replying to the corresponding end of question part for the recognition-stage speech recognition result; and
a display device for providing the set of answer candidates to a user.

17. A method for detecting an end of question part in speech recognition results, the method comprising;
storing, in a storage unit, a plurality of clusters, each of the plurality of clusters comprising at least one partial set of words, each of the partial set of words being a set of words from a beginning of a training-stage speech recognition result to the end of question part of the training-stage speech recognition result;
calculating, by a processor, in response to receiving a recognition-stage speech recognition result incrementally in a word by word manner as an input, a similarity between the input and the plurality of clusters; and
outputting, by the processor, the end of question part for the recognition-stage speech recognition result based on the similarity between the input and any of the plurality of clusters being less than a predetermined threshold;
splitting, by the processor, the recognition-stage speech recognition result at the corresponding end of question part for the recognition-stage speech recognition result;
generating, by the processor, a set of answer candidates for replying to the corresponding end of question part for the recognition-stage speech recognition result; and
providing, by a display device, the set of answer candidates to a user.

\* \* \* \* \*